ANALOG-TO-DIGITAL CONVERTER

INVENTOR
R. A. KAENEL
BY Lucian C. Canepa

ATTORNEY

Feb. 13, 1962 R. A. KAENEL 3,021,517

ANALOG-TO-DIGITAL CONVERTER

Filed Aug. 22, 1960 5 Sheets-Sheet 2

INVENTOR
R. A. KAENEL
BY Lucian C. Canepa
ATTORNEY

INVENTOR
R. A. KAENEL
BY Lucian C. Canepa
ATTORNEY

INVENTOR
R. A. KAENEL
BY Lucian C. Canepa
ATTORNEY

INVENTOR
R. A. KAENEL
BY Lucian C. Canepa
ATTORNEY 3,021,517

ANALOG-TO-DIGITAL CONVERTER

Reginald A. Kaenel, Murray Hill, N.J., assignor to Bell Telephone Laboratories, Incorporated, New York, N.Y., a corporation of New York Filed Aug. 22, 1960, Ser. No. 51,017
16 Claims. (Cl. 340—347)

This invention relates to the high speed conversion of information, and more particularly to analog-to-digital converters employing negative resistance diodes.

In one well-known type of analog-to-digital converter, the process of converting or encoding an analog sample into an $n$-digit binary code group is carried out sequentially in a digit-by-digit manner, most significant digit first, and requires $n$ digit decisions to completely encode a single analog sample. This type of conversion can be viewed as a geometric progression in which it is first determined in which half of the entire group of possible codes the analog signal sample should be placed; then it is determined in which quarter of the selected half the signal sample should be placed; next, it is determined in which eighth of the selected quarter the signal sample should be placed, and so forth. The process is carried on until the amplitude of the analog signal is specified to the desired degree of fineness. In order to determine the amplitude to one part in 127, in a coder of the type in which the coding steps are linearly related to the amplitude of the analog signal, seven separate digit decisions have to be made. One additional digit decision would, of course, permit determination to one part in 255.

Typically, an $n$-digit analog-to-digital converter of the digit-by-digit decision type operates in a synchronous manner under the control of an external clock or timing source that respectively provides $n$ sequential clock pulses to $n$ different circuit points of the converter. In response to these pulses such a converter sequentially performs and stores the results of $n$ amplitude comparison or digit decision operations.

An object of the present invention is the improvement of information converters, particularly analog-to-digital converters.

Another object of this invention is the provision of digit-by-digit decision type analog-to-digital converters which do not require for their operation complicated external clock or timing sources.

A further object of the present invention is the provision of analog-to-digital converters which are characterized by high speed, low power dissipation, high reliability, and extreme simplicity of design.

These and other objects of the present invention are realized in a specific illustrative analog-to-digital converter embodiment thereof that includes $n$ digit decision and storage stages each of which comprises two negative resistance diodes of the voltage-controlled type connected in series-aiding. Sequential timing of the $n$ stages is under the control of a shift register circuit which is driven by a two-phase source of timing signals and a combination that includes a trigger pulse source and a synchronizing circuit therefor.

Connected to a point between the diodes of each pair is an arrangement including a summing amplifier circuit or bipolar source for selectively causing one of the diodes to conduct therethrough more current than the other, thereby controlling the mode of operation of each stage in response to the application thereto of a switching signal.

Besides driving the shift register circuit via the synchronizing circuit, the trigger pulse source controls a reset signal source that is connected to the input of the summing amplifier. A first output pulse from the trigger pulse source initiates a cycle of operation in which the lower diode of each of the $n$ stages of the illustrative converter is initially placed in its relatively high voltage stable condition representative, for example, of a "0" signal. Then, an analog signal to be converted is applied to the summing amplifier causing current flow in a given direction to the point between the series-aiding diodes, and a second trigger or convert pulse and timing signals are applied to the shift register circuit. In turn, the first stage of the shift register circuit supplies a switching signal to the first or most significant digit stage of the converter to cause the lower diode to switch to the relatively low voltage positive resistance region of the voltage-current characteristic curve thereof. This switching action causes a binary-weighted current to be applied to the input circuit of the summing amplifier. Assuming that this binary-weighted current is less than the current derived from the input analog signal, the output of the summing amplifier is such as to cause the current flow to the point between the series-aiding diodes to continue in the given direction. Consequently, to indicate that the digital code representation of the analog signal should include a "1" signal in the most significant digit place thereof, the series-aiding diode configuration switches to a new operating condition, in which the upper diode assumes a stable point on the relatively high voltage positive resistance region of its characteristic curve and the lower diode stabilizes at a point on the relatively low voltage positive resistance region of its characteristic curve.

Thus, for the considered case in which the binary-weighted current from the first or most significant stage is less than the current derived from the input analog signal, the lower diode of the first stage is caused to switch to and remain in its relatively low voltage stable condition representative of a "1" signal, which condition causes the continued application of the binary-weighted output current to the input circuit of the summing amplifier.

If, on the other hand, the switching of the lower diode of the first stage to the relatively low voltage positive resistance region of its characteristic curve causes a binary-weighted current of a magnitude greater than the current derived from the input analog signal to be applied to the input circuit of the summing amplifier, the summing amplifier is cut off and an auxiliary power source connected to the output electrode thereof causes the current flow to the point between the series-aiding diodes to reverse in direction. Consequently, to indicate that the digital code representation of the analog signal should not include a "1" signal in the most significant digit place thereof, the series-aiding diode configuration switches back to its initial operating condition, in which the upper diode returns to a stable point on the relatively low voltage positive resistance region of its characteristic curve and the lower diode stabilizes at a point on the relatively high voltage positive resistance region of its characteristic curve, which latter point is representative of a "0" signal and corresponds to a voltage that causes the application of the binary-weighted current from the first stage to the input circuit of the summing amplifier to be discontinued.

At the conclusion of its digit decision or amplitude comparison operation, the first or most significant digit stage of the converter stores the result of the operation; then, the second stage of the shift register supplies a switching signal to the second digit decision and storage stage, thereby to cause the diodes of the second stage of the converter to undergo a switching cycle of the type specified above in connection with the description of the first stage. The binary-weighted current contributed by the second stage to the input circuit of the summing amplifier adds to the current contributed thereto by the first stage, which, as specified above, may be either a binary-weighted current value indicative of a "1" signal in the most significant digit place or a zero current value indicative of a "0" signal in the most significant digit place.

In a similar manner, each stage of the specific analog-to-digital converter described herein responds to an applied switching signal from the shift register circuit by performing an amplitude comparison operation and then storing the result of that operation.

Thus, an illustrative analog-to-digital converter made in accordance with the principles of the present invention includes a plurality of highly reliable and simple stages each of which possesses amplitude discriminating and memory capabilities, the sequential operation of the stages being under the control of a shift register circuit.

It is a feature of the present invention that an analog-to-digital converter include $n$ stages each comprising two negative resistance diodes of the voltage-controlled type connected in series-aiding.

It is another feature of this invention that an analog-to-digital converter include $n$ stages each of which includes two series-aiding negative resistance diodes of the voltage-controlled type to the midpoint of which is connected a bipolar source whose output current controls the mode of switching of the diodes in response to an applied trigger pulse.

It is still another feature of the present invention that an analog-to-digital converter include $n$ stages each comprising two series-aiding negative resistance diodes of the voltage-controlled type, a bipolar source connected to the midpoint of the diodes for controlling the mode of switching thereof in response to an applied switching signal, and a shift register circuit for sequentially supplying $n$ switching signals to the stages of the converter.

A complete understanding of the present invention and of the above and other features and advantages thereof may be gained from a consideration of the following detailed description of an illustrative embodiment thereof presented hereinbelow in connection with the accompanying drawing, in which.

Figure 1:
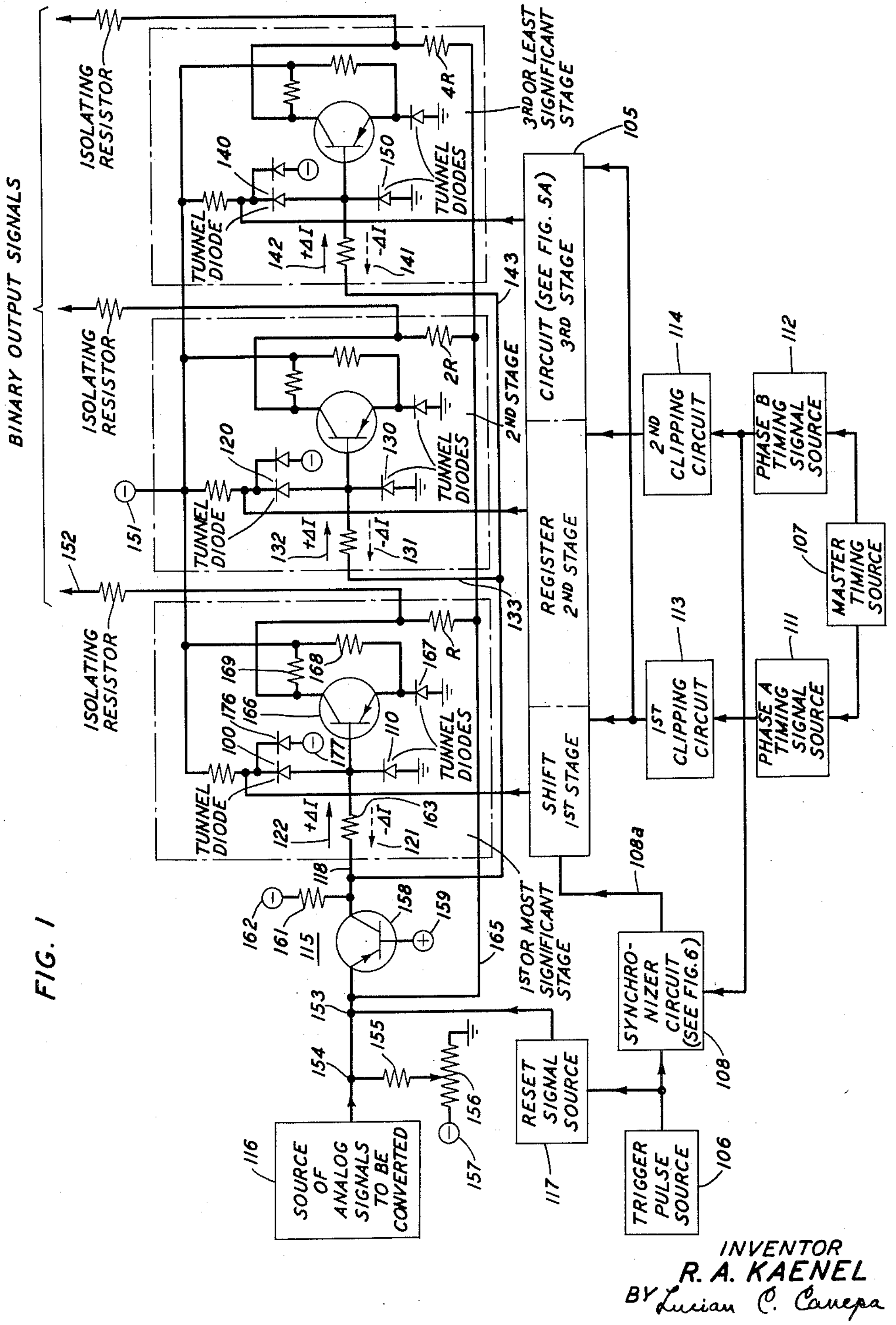
FIG. 1 depicts a three-stage analog-to-digital converter which illustratively embodies the principles of the present invention.
Figure 4:
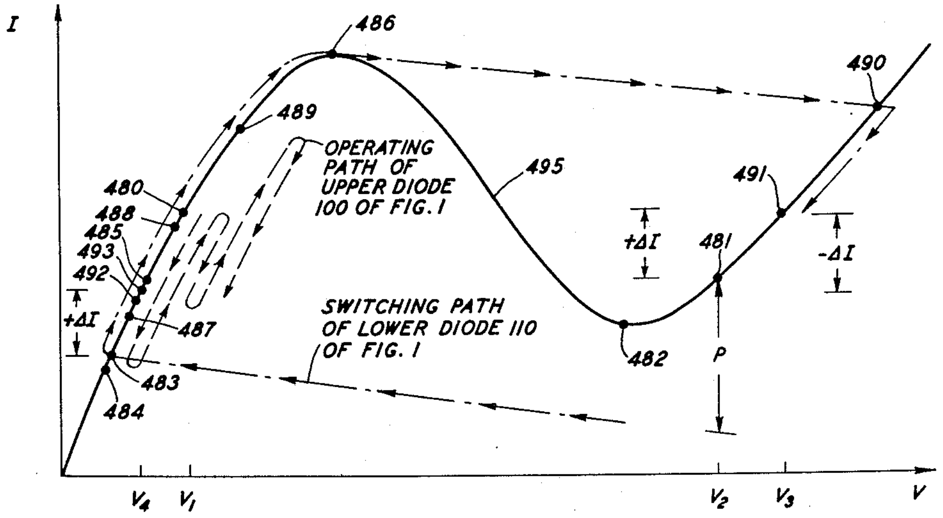
Figure 5A:
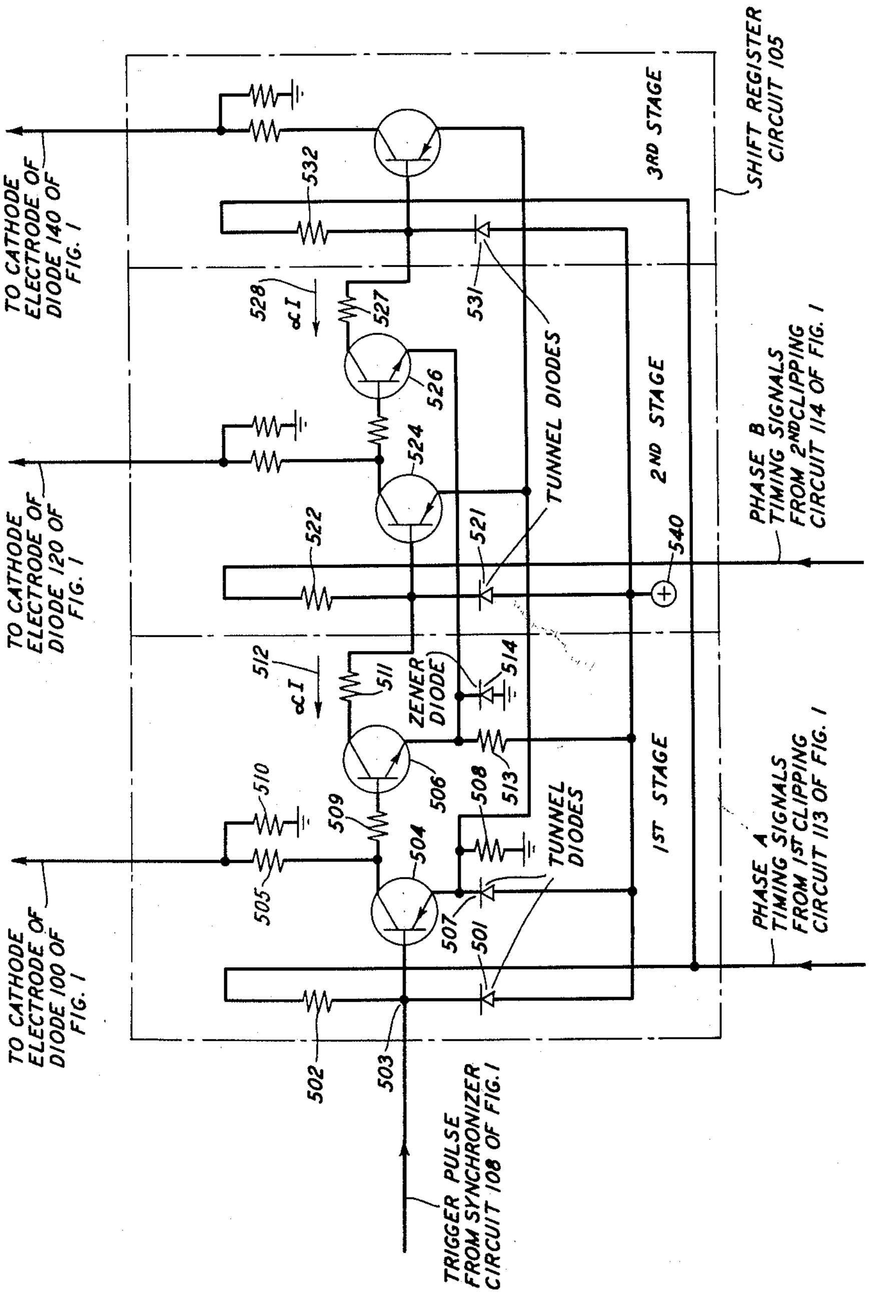
Figure 5B:
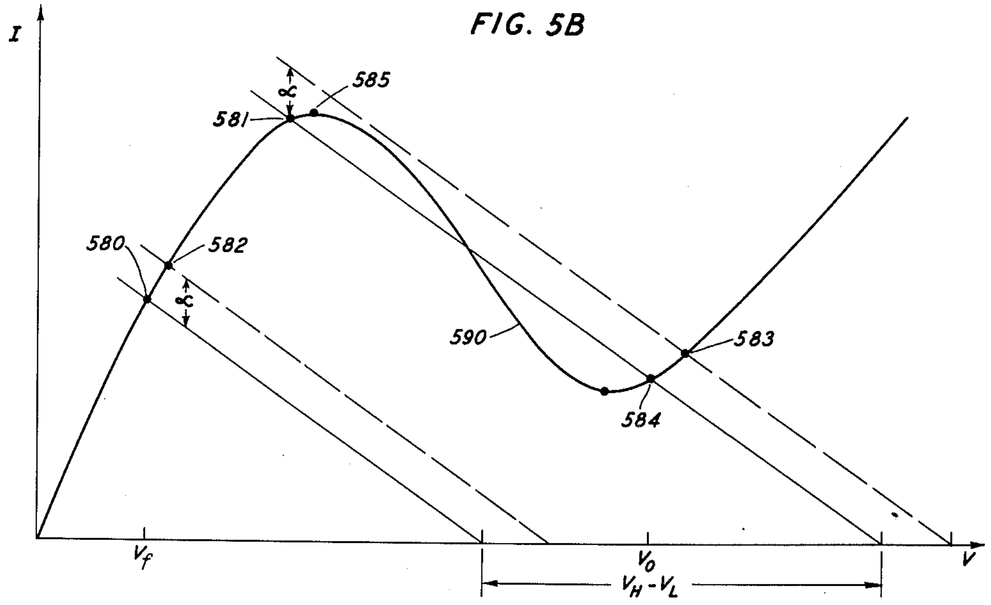
Figure 6:
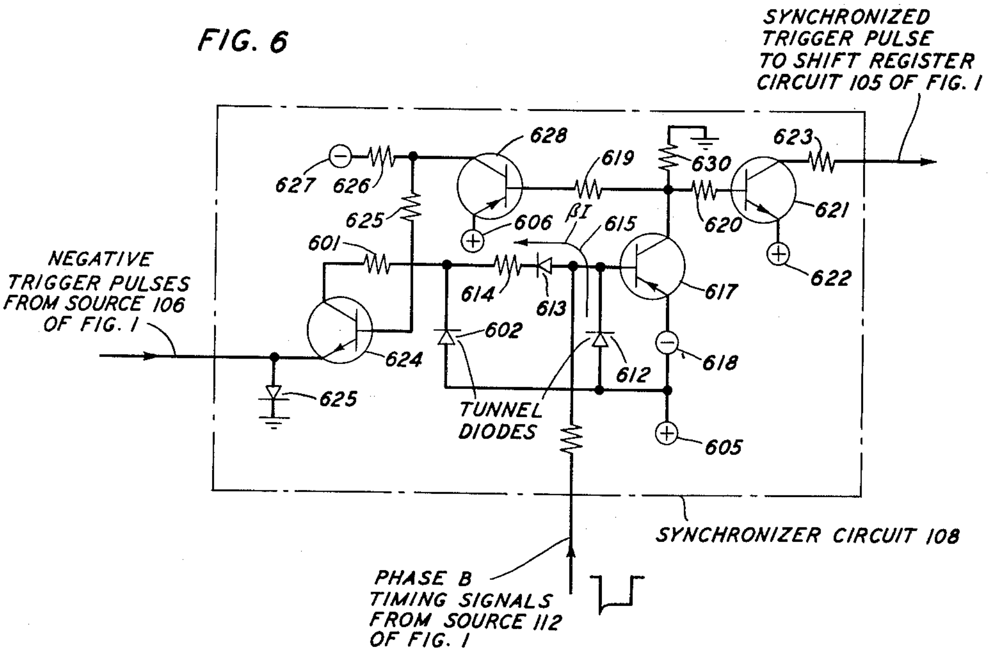

FIG. 4 also illustrates the voltage-current characteristic curve of each of the series-aiding diodes shown in FIG. 1 and, further, indicates another type of switching action that takes place in a stage of the embodiment of FIG. 1 in response to an applied switching signal;

FIG. 5A is a detailed schematic depiction of the shift register circuit shown in FIG. 1;

FIG. 5B is a graphical illustration which is helpful in understanding the operation of the shift register circuit shown in FIG. 5A; and FIG. 6 is a detailed schematic depiction of the synchronizer circuit shown in FIG. 1.

A great variety of electronic devices and circuits exhibit negative resistance characteristics and it has long been known that such negative resistance characteristics may have one of two forms. The N-type negative resistance, which is referred to as open-circuit stable (or short-circuit unstable, or current-controlled) is characterized by zero-resistance turning points. The S-type negative resistance, which is referred to as short-circuit stable (or open-circuit unstable, or voltage-controlled) is the dual of the N-type and is characterized by zero-conductance turning points. The thyratron and dynatron are vacuum tube examples of devices which respectively exhibit N- and S-type negative resistance characteristics.

Illustrative embodiments of the principles of the present invention include negative resistance diodes of the voltage-controlled type. One highly advantageous example of this type of two-terminal negative resistance arrangement is the so-called tunnel diode. Tunnel diodes are described in the literature: see, for example, "New Phenomenon in Narrow Germanium P–N Junctions," L. Esaki, Physical Review, volume 109, January-March 1958, pages 603–604; "Tunnel Diodes as High-Frequency Devices," H. S. Sommers, Jr., Proceedings of the Institute of Radio Engineers, volume 47, July 1959, pages 1201–1206; and "High-Frequency Negative-Resistance Circuit Principles for Esaki Diode Applications," M. E. Hines, The Bell System Technical Journal, volume 39, May 1960, pages 477–513.

The tunnel diode comprises a p-n junction having an electrode connected to each region thereof, and is similar in construction to other semiconductor diodes used for such various purposes as rectification, mixing, and switching. The tunnel diode, however, requires two unique characteristics of its p-n junction; that it be narrow (the chemical transition from n-type to p-type region must be abrupt), of the order of 100 Angstrom units in thickness, and that both regions be degenerate (i.e., contain very large impurity concentrations, of the order of $10^{19}$ per cubic centimeter).

The tunnel diode offers many physical and electrical advantages over other two-terminal negative resistance arrangements. These advantages include: potentially low cost, environmental ruggedness, reliability, low power dissipation, high frequency capability, and low noise properties. Advantageously, then, the negative resistance diodes included in illustrative embodiments of the principles of the present invention are tunnel diodes.

Referring now to FIG. 1, there is shown a specific illustrative three-stage analog-to-digital converter made in accordance with the principles of the present invention. Each stage of the converter includes a pair of negative resistance diodes of the voltage-controlled type connected in series-aiding. Specifically, the first or most significant digit stage includes an upper diode 100 and a lower one 110. The second stage includes upper and lower diodes 120 and 130, respectively, and the third or least significant digit stage includes upper and lower diodes 140 and 150, respectively. Each pair of diodes is connected to a negative source 151 of direct-current power which is selected to be of a value that allows only one diode at a time of a pair to be maintained at a stable point on the relatively high voltage positive resistance region of the characteristic curve thereof, the other diode being maintained at a stable operating point on the relatively low voltage positive resistance region of its characteristic curve.

Sequential operation of the three stages of the illustrative converter shown in FIG. 1 is under the control of a shift register circuit 105, the input signals to which are derived from a trigger pulse source 106 and a master timing source 107. Pulses from the source 106 are coupled to the shift register circuit 105 through a synchronizer circuit 108 which, as will be described in detail hereinbelow, insures that a pulse from the source 106 is applied to the first stage of the shift register circuit 105 in a predetermined time relationship with respect to timing signals derived from the source 107.

The master timing source 107 is coupled to two timing signal sources whose output wave trains are identical in configuration and 180 degrees out of phase, one source 111 being designated the phase A timing signal source and the other one 112 being designated the phase B timing signal source. The output of the source 111 is coupled through a first clipping circuit 113 to the first and third stages of the shift register circuit 105, and the output of the source 112 is coupled through a second clipping circuit 114 to the second stage of the shift register circuit 105.

In FIG. 1, analog signals to be converted or encoded into a binary code group are coupled to the input circuit of a summing amplifier or bipolar source 115 from a signal source 116. Also coupled to the input circuit of the summing amplifier 115 is the output of a reset signal source 117 which responds to alternate ones of the pulse outputs of the source 106 to supply a negative input voltage to the input circuit of the summing amplifier 115, thereby to cause the current in amplifier output lead 118 to flow in the direction indicated by dashed arrow 121, which requires that the current flow through the bottom diode of a pair exceed in value the current that flows through the upper diode of the pair. The diodes 100 and 110, for example, then respond to a reset switching signal from the first stage of the shift register circuit 105 to switch to a condition in which the lower diode 110 comes to rest at a relatively high voltage stable point and the upper diode 100 comes to rest at a relatively low voltage stable point. The subsequent application to the summing amplifier 115 of an analog signal to be converted causes the current in the output lead 118 of the amplifier to flow in the direction indicated by solid arrow 122, thereby to cause the stable operating point of the lower diode 110 to shift to a high voltage-low current point and the stable operating point of the upper diode 100 to shift to a low voltage-high current point.

Similarly, during the time that the input voltage to the summing amplifier 115 is clamped at a negative potential by the reset signal source 117, the series-aiding diodes of the second and third stages of the converter respond to reset switching signals supplied by the shift register circuit 105 to assume operating conditions in which each lower diode is at a relatively high voltage stable operating point and in which each upper diode is at a relatively low voltage stable operating point. Then, when the input circuit of the summing amplifier 115 is unclamped by the reset signal source 117, thereby allowing the input voltage to the summing amplifier to be determined by the analog signal to be converted, current flow in amplifier output leads 133 and 143, which extend through resistors to the midpoints of the series-aiding diodes of the second and third converter stages, respectively, is in the direction of solid arrows 132 and 142, thereby to cause the stable operating points of the lower diodes 130 and 150 to shift to high voltage-low current points and the stable operating points of the upper diodes 120 and 140 to shift to low voltage-high current points.

Then, the application of a convert switching signal from the first stage of the shift register circuit 105 to the first stage of the analog-to-digital converter initiates a digit decision and storage switching cycle which causes a current to be supplied through a binary-weighted resistor R to the input circuit of the summing amplifier 115. If this current contribution through the resistor R exceeds in value the current supplied to the input circuit of the summing amplifier by the analog signal from the source 116, the direction of current flow in the output lead 118 of the amplifier 115 reverses to assume the direction indicated by the dashed arrow 121. As a result, at the completion of the aforementioned switching cycle, and as will be described hereinbelow in detail in connection with FIG. 4, the lower diode 110 returns to a stable operating point on the relatively high voltage positive resistance region of its characteristic curve and the upper diode 100 returns to a stable operating point on the relatively low voltage positive resistance region of its characteristic curve. Accordingly, current flow through the binary-weighted resistor R is discontinued, and the resultant digital output signal on the lead 152 from the first or most significant digit stage of the converter is a relatively low voltage or "0" signal, thereby indicating that the proper encoding of the assumed analog signal requires a "0" signal in the most significant digit place of the binary code group which is to represent the analog signal.

If, on the other hand, the current contributed through the binary-weighted resistor R does not exceed in value the current supplied to the summing amplifier input circuit by the analog signal, the direction of current flow in the amplifier output lead 118 remains as indicated by the solid arrow 122. As a result, at the completion of the aforementioned switching cycle, and as will be described hereinbelow in detail in connection with FIG. 3, the lower diode 110 comes to rest at a stable operating point on the relatively low voltage positive resistance region of its characteristic curve and the upper diode 100 comes to rest at a stable operating point on the relatively high voltage positive resistance region of its characteristic curve. Accordingly, current flow through the binary-weighted resistor R is maintained, and the resultant digital output signal on the lead 152 from the first or most significant digit stage is a relatively high voltage or "1" signal, thereby indicating that the proper encoding of the assumed analog signal requires a "1" signal in the most significant digit place of the binary code group which is to represent the analog signal.

The trigger pulse source 106 may be a conventional pulse generator and the reset signal source 117 may be a relaxation oscillator of a type which responds to alternate ones of the output pulses of the source 106 to cause the reset source 117 to clamp the point 153 at a negative potential with respect to ground.

Analog signals to be encoded by the converter shown in FIG. 1 are coupled from the source 116 to a node point 154 to which is connected one end of a resistor 155 whose other or lower end is adjustably connected to a resistor 156 across which a negative direct-current bias source 157 is connected. The polarity of input analog signals to be encoded is such as to tend to drive the point 154 positive with respect to ground, the point 154 not, however, actually becoming more positive than the base of transistor 115 until the threshold bias established between the lower end of the resistor 155 and ground is overcome.

The node point 154 is connected to the emitter electrode of the summing amplifier 115 which comprises a p-n-p transistor 158 whose base electrode is connected to a positive direct-current bias source 159 and whose collector electrode is connected through a resistor 161 to a negative direct-current bias source 162. Until the emitter or input electrode of the transistor 158 becomes positive with respect to the base electrode thereof, the transistor remains cut off and current flow in the amplifier output lead 118 is through resistors 163 and 161 to the source 162 in the direction indicated by the dashed arrow 121, which has the designation $-\Delta I$ adjacent thereto. When, however, current flows down from the node point 154 through the resistor 155 to cause the node point to exceed the positive potential of the base electrode of the transistor 158, the transistor 158 is turned on and current flows in the lead 118 through the resistor 163 in the direction of the solid arrow 122, which is marked $+\Delta I$.

Also coupled to the node point 154, and therefore also contributive to the determination of the voltage condition of the emitter electrode of the transistor 158 of FIG. 1, is a lead 165 which extends through an appropriately weighted resistor to the current generator of each of the stages of the illustrative analog-to-digital converter described herein. Thus, for example, when the current generator of the first or most significant digit stage is turned on, the output of the generator flows through the binary-weighted resistor R through the lead 165 from the input circuit of the transistor 158, thereby tending to drive the point 154 negative with respect to ground.

The current generator of the first stage includes a p-n-p transistor 166 whose base electrode is connected to the midpoint of the two series-aiding negative resistance diodes 100 and 110, whose emitter electrode is connected both to the cathode of a voltage-controlled negative resistance diode 167, which acts as a voltage source, and through a resistor 168 to the negative direct-current bias source 151, and whose collector electrode is connected both to the binary-weighted resistor R and through a resistor 169 to the source 151.

When the lower diode 110 is in its relatively high voltage stable state, the midpoint of the diodes 100 and 110 is relatively negative with respect to the emitter electrode of the transistor 166 and, as a result, the transistor 166 conducts, thereby providing a low impedance path to ground which prevents any current derived from the source 151 from flowing through the binary-weighted resistor R from the input circuit of the summing transistor 158. However, when the lower diode 110 is switched to its relatively low voltage stable state, the midpoint of the diodes 100 and 110 becomes relatively positive with respect to the emitter electrode of the transistor 166 and, consequently, the transistor 166 is turned off, the drop across the emitter diode 167 then acting as a voltage source that insures that the transistor 166 is positively cut off. Under such conditions, current flows through the resistor R and the lead 165 from the node point 154 of the input circuit of the summing transistor 158, at which point 154 the summing or comparison of the current derived from the analog signal and that contributed by the current generator of the first stage occurs. In turn, as previously explained, the result of this comparison determines the operating condition of the summing transistor 158.

The second and third stages of the analog-to-digital converter shown in FIG. 1 operate in the same manner as, and are similar in configuration to the first stage, whose mode of operation and circuit arrangement are completely described herein. Although only three stages are depicted in FIG. 1, it is to be clearly understood that in accordance with the principles set forth herein an $n$ stage analog-to-digital converter may be constructed.

Figure 2:
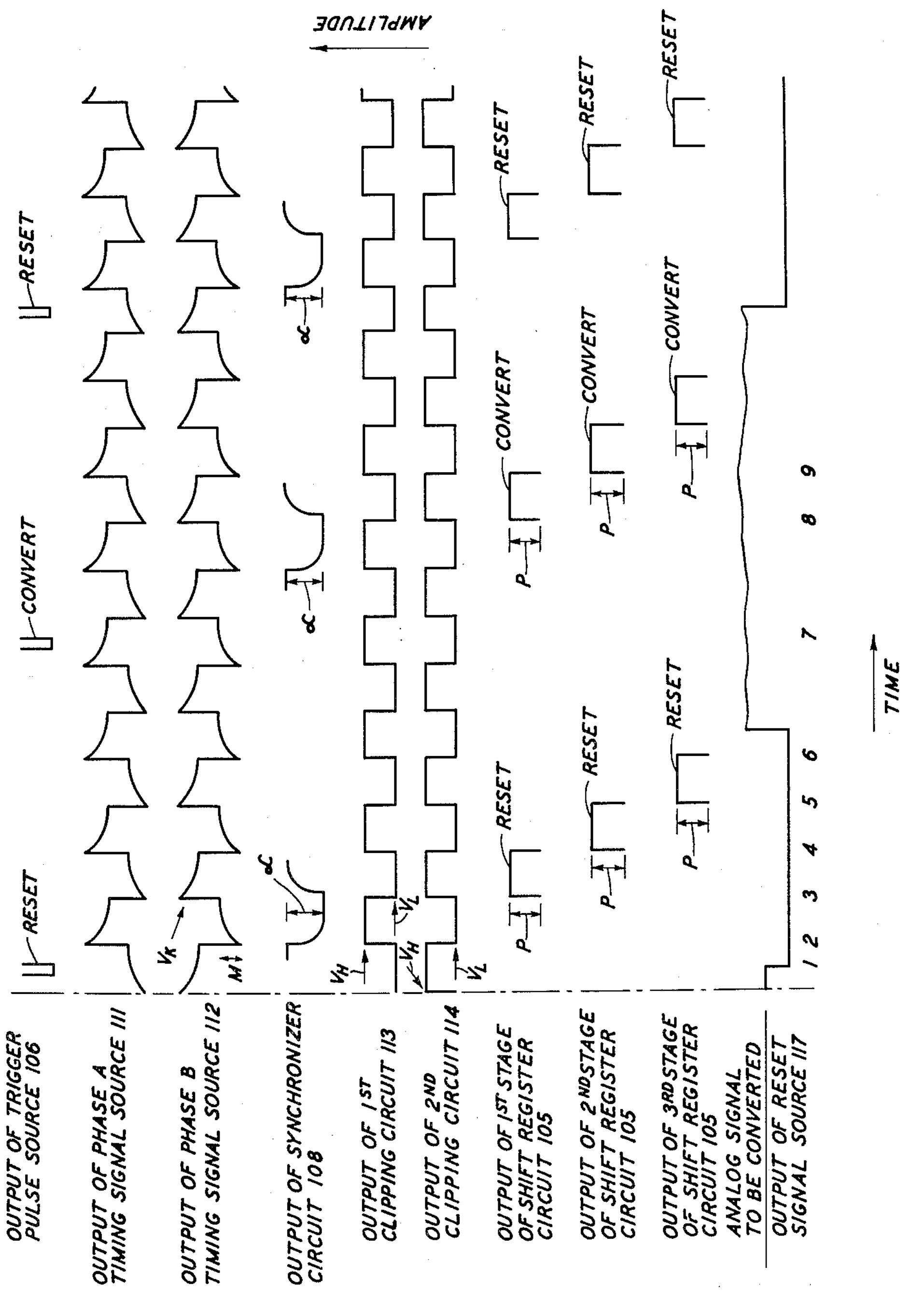
FIG. 2 depicts various waveforms characteristic of the converter shown in FIG. 1.

The waveforms shown in FIG. 2 are helpful in summarizing the over-all operation of the illustrative converter depicted in FIG. 1. The source 106 of FIG. 1 periodically supplies trigger pulses to the reset signal source 17 and to the synchronizer circuit 108. These pulses are designated in FIG. 2 as being reset or convert pulses, depending respectively on the type of switching cycle which the pulses initiate in the converter of FIG. 1. Thus, for example, the source 106 supplies to the synchronizer circuit 108 at time 1 a reset pulse. This pulse reappears on the output lead 108a of the circuit 108 at time 2 and, in combination with the output of the reset signal source 117 and the outputs of the timing signal sources 111 and 112, causes the illustrative converter to undergo a switching cycle of operation that insures that all of the converter stages are reset, i.e., causes all of the lower diodes 110, 130, and 150 to assume relatively high voltage stable operating points.

Each of the timing signal sources 111 and 112, which may, for example, be monostable regenerative amplifier circuits, supplies an identical output wave train of regenerated pulses, the wave trains being, however, as shown in FIG. 2, 180 degrees out of phase. The sources 111 and 112 constitute a two-phase power supply.

The output of the source 112 is coupled to the synchronizer circuit 108 and, after passing through a conventional clipping or squaring circuit 114, is coupled to the even-numbered registers of the shift register circuit 105; while the output of the source 111 is coupled to a clipping or squaring circuit 113 whose output is coupled to the odd-numbered stages of the shift registered circuit 105.

As indicated in FIG. 2, the output pulse of the trigger source 106 combines at time 2 with the negative-going output pulse edge of the timing signal source 112 to cause the synchronizer circuit 108 to switch, which in turn at time 3 causes the first stage of the shift register circuit 105 to supply a reset switching signal of amplitude P to the first stage of the converter. During the existence of this reset switching signal, viz., during the time interval designated 3 through 4 on the time axis of FIG. 2, the first converter stage is reset. Then, during the time interval marked 4 through 5, the second stage of the shift register circuit 105 supplies a reset switching signal to the second stage of the converter. Finally, during the time interval marked 5 through 6 the third stage of the shift register circuit 105 supplies a reset switching signal to the third stage of the converter. The bottommost wave train of FIG. 2 indicates that the reset signal source 117 clamps the input of the summing amplifier 115 at a negative potential with respect to ground during the time in which reset switching signals are supplied to the converter stages by the shift register circuit 105.

Thereafter, at the time marked 7 on the abscissa of FIG. 2, the source 106 supplies a second or convert trigger pulse, which is synchronized by the circuit 108 to be effective at the input of the first stage of the free-running shift register circuit 105 at time 8. This synchronized pulse combines with the output of the first clipping circuit 113 to initiate a conversion switching cycle of operation in the illustrative converter. Thus, for example, during the time interval marked 8 through 9, the first stage of the shift register circuit 105 supplies a convert switching signal to the first stage of the converter. In turn, during the time interval 8 through 9, the first converter stage performs a digit decision or amplitude comparison operation and stores the result thereof. Subsequently, the second and third stages of the shift register circuit 105 respectively supply switching signals to the second and third converter stages.

The principles of the present invention will be better understood if the switching action of one pair of the series-aiding diodes of FIG. 1, for example the switching action of the diodes 100 and 110 of the first stage of the converter, is described in detail. For this purpose, the graphical depictions of FIGS. 3 and 4 are helpful.

Figure 3:
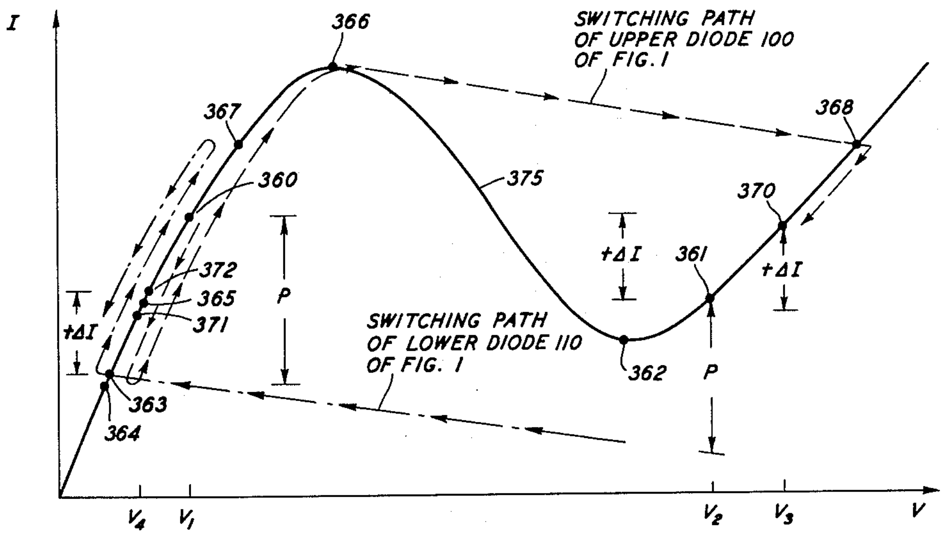
FIG. 3 illustrates the voltage-current characteristic curve of each of the series-aiding diodes shown in FIG. 1 and, further, illustrates one type of switching action that takes place in a stage of the embodiment of FIG. 1 in response to an applied switching signal.

Referring first to FIG. 3, there are shown the initial stable operating points 360 and 361 of the diodes 100 and 110, respectively, of FIG. 1. To conform with the assumption that the initial application of an analog signal to the input circuit of the summing amplifier 115 causes a current to flow in the amplifier output lead 118 in the direction of the solid arrow 122, the current corresponding to the operating point 360 is indicated in FIG. 3 as being greater by an amount $+\Delta I$ than the value of the current corresponding to the operating point 361.

The subsequent application from the first stage of the free-running shift register circuit 105 to the first stage of the converter of FIG. 1 of a positive current convert pulse causes a current decrement of amplitude P to flow through each of the diodes 100 and 110. This causes the operating point of the lower diode 110 to switch from the point 361 past the valley point 362 on the characteristic curve 375 of FIG. 3 to a point 363 on the relatively low voltage positive resistance region of the curve. During this same time interval, the current flowing through the upper diode 100, which was also decreased by the value P, as represented by a shift in the operating point of the diode 100 from the point 360 to a lower current point 364, assumes the value represented by point 372. Then, as the input convert pulse from the first stage of the shift register circuit 105 decreases to a zero value, the operating point of the lower diode 110 shifts to a point 365 whose current value is the same as that which corresponds to the initial operating point 361, while the operating point of the upper diode 100 shifts back to its initial operating point 360, the currents corresponding to the points 360 and 365 differing by $+\Delta I$. Next, as the respective potentials across the series-aiding diodes 100 and 110 increase so as to assume equilibrium values determined by the series combination including the source 151 and the resistor 173 of FIG. 1, the points 360 and 365 charge upward on the relatively low voltage positive resistance region of the characteristic curve 375 toward the peak point 366 thereof. In so doing, the current difference $+\Delta I$ is maintained, which, in other terms, means that FIG. 3 depicts the switching cycle that results when the current contribution through the binary-weighted resistor R of FIG. 1 to the input circuit of the summing amplifier 115 is less than the current contributed thereto by the analog signal to be converted.

When the operating point of the upper diode 100 of FIG. 1 reaches the peak point 366 of the characteristic curve 375 shown in FIG. 3, the operating point of the lower diode 110 reaches a point 367. The upper diode then switches to a point 368 on the relatively high voltage positive resistance region of the curve 375 and then charges downward toward the valley point 362, and the operating point of the lower diode 110 then charges downward on the relatively low voltage positive resistance region of the curve 375 so as to maintain the difference $+\Delta I$ between the current values flowing through the two series-aiding diodes. Finally, the upper diode 100 comes to rest at a relatively high voltage point 370 and the lower diode 110 comes to rest at a relatively low voltage point 371 whose corresponding voltage value $V_4$ maintains a current flow through the binary-weighted resistor R of FIG. 1, thereby causing a "1" signal to appear across the resistor R. Note that the current values corresponding to the points 370 and 371 differ by the amount $+\Delta I$ and that the sum of the voltages $V_3$ and $V_4$ corresponding to the points 370 and 371 is equal to the sum of the voltages $V_1$ and $V_2$, which are the voltage values of the initial operating points 360 and 361, respectively.

If, as a result of a digit decision or amplitude comparison operation in a stage other than the most significant digit one, the output current of the summing amplifier 115 of FIG. 1 should be caused to flow in the direction of the dashed arrow 121, thereby necessitating that the difference between the currents through the diodes 100 and 110 be $-\Delta I$, the operating point 370 of the upper diode 100 shifts downward to the point 361 of FIG. 3 and the operating point 371 of the lower diode 110 shifts upward to the point 360, in which case the lower diode is still at a relatively low voltage $V_1$ which is sufficient to maintain current flow through the binary-weighted resistor R. Thus, it is evident that the switching actions in other stages cannot destroy the stored state of an already switched stage.

Referring now to FIG. 4, there is depicted the switching cycle which results when a stage or combination of stages contribute to the input circuit of the summing amplifier 115 of FIG. 1 a current whose value is greater than the value contributed thereto by the analog signal to be converted. Such a current relationship necessitates that the current flow in the output lead of the summing amplifier be in the direction of the dashed arrow 121 of FIG. 1.

Specifically, points 480 and 481 on the characteristic curve 495 shown in FIG. 4 represent the initial operating points of the diodes 100 and 110, respectively, of FIG. 1 in the presence of an applied analog signal and just prior to the application of a convert switching signal from the first stage of the shift register circuit 105. The points 480 and 481 correspond exactly to the points 360 and 361, respectively, of FIG. 3. Thus, the current values corresponding to the points 480 and 481 differ by an amount $+\Delta I$ and the voltage values corresponding thereto are $V_1$ and $V_2$, respectively.

The application from the first stage of the free-running shift register circuit 105 to the first stage of the converter of FIG. 1 of a positive convert pulse causes a current decrement of amplitude P to flow through each of the diodes 100 and 110. This causes the operating point of the lower diode 110 to switch from the point 481 past the valley point 482 of the characteristic curve 495 to a point 483 on the relatively low voltage positive resistance region of the curve 495. During this same time interval, the current flow through the upper diode 100 also decreases by the value P, as represented by a shift in the operating point of the diode 100 from the point 480 to a lower current point 484, and finally assumes point 493 to maintain the current difference $+\Delta I$. Subsequently, as the convert switching signal from the shift register circuit 105 decreases to a zero value, the operating point of the lower diode 110 shifts to a point 485 whose current value is the same as that corresponding to the initial operating point 481 and the operating point of the upper diode 100 shifts back from the point 484 to the initial operating point 480, the current difference between the points 480 and 485 having the value $+\Delta I$. Then, as the respective potentials across the series-aiding diodes 100 and 110 increase so as to assume equilibrium values determined by the series combination including the sources 151 and the resistor 173 of FIG. 1, the points 480 and 485 tend to charge upward on the relatively low voltage positive resistance region of the curve 495 toward the peak point 486 thereof. In so doing, however, and due to the fact that it has been hypothesized for the switching action depicted in FIG. 4 that the current contributed through the binary-weighted resistor R of FIG. 1 to the input circuit of the summing amplifier 115 is greater than the current contributed thereto by the analog signal, which in turn necessitates that the direction of current flow in the amplifier output lead 118 switch from the direction indicated by the solid arrow 122 to the direction indicated by the dashed arrow 121, the current difference $+\Delta I$ decreases to zero and then changes to the value $-\Delta I$. In other words, the operating point 480 of the upper diode 100 shifts to a point 487 while the operating point of the lower diode 110 shifts to a point 488 whose corresponding current value is greater by an amount $\Delta I$ than the current value which corresponds to the point 487. Then, the operating point 488 of the lower diode 110 charges upward to the peak point 486 and switches to a point 490 on the relatively high voltage positive resistance region of the curve 495, while the operaing point 487 of the upper diode 100 charges upward to a point 489. Subsequently, the operating point of the lower diode 110 charges downward from the point 490 toward the valley point 482, and the operating point of the upper diode 100 charges downward from the point 489 on the relatively low voltage positive resistance region so as to maintain the difference $-\Delta I$ between the current values flowing through the two series-aiding diodes. Finally, the lower diode 110 comes to rest at a relatively high voltage point 491 whose corresponding voltage value $V_3$ causes current flow through the binary-weighted resistor R to be discontinued, thereby causing a "0" signal to appear across the resistor R, and the upper diode 100 comes to rest at a relatively low voltage point 492. Note that the current values corresponding to the points 491 and 492 differ by the amount $-\Delta I$ and that the sum of the voltages $V_3$ and $V_4$ corresponding to the points 491 and 492 is equal to the sum of the voltages $V_1$ and $V_2$, which are the voltage values of the initial operating points 480 and 481, respectively.

At the completion of a full conversion or encoding cycle, it is necessary to reset the stages of the illustrative analog-to-digital converter described herein to their "0" states, i.e., reset the lower diode of each stage to its relatively high voltage stable state. This is done under the control of a reset pulse from the source 106. Such a pulse causes the first stage of the shift register circuit 105 to supply a reset switching signal to the first converter stage. The pulse from the source 106 is also applied to the reset signal source 117 to cause it to couple a negative signal to the input circuit of the summing amplifier 115 to cause the direction of current flow in the output lead 118 thereof to be in the direction of the dashed arrow 121.

This combination, i.e., a reset switching signal to the point 174 of the first converter stage and a current flow from the midpoint of the diodes in the direction of the arrow 121, causes the diodes 100 and 110 to assume the initial operating points 360 and 361, respectively, of FIG. 3, or 480 and 481, respectively, of FIG. 4, thereby readying the diodes for conversion of another applied analog signal upon the receipt of a subsequent pulse from the trigger pulse source 106.

More specifically, if at the completion of a conversion cycle the operating points of the diodes 100 and 110 of FIG. 1 are at the points 370 and 371, respectively, as shown in FIG. 3, a current flow in the amplifier output lead 118 in the direction of the dashed arrow 121 causes the point 370 to shift to the point 361 and the point 371 to shift to the point 360. The positive reset switching pulse applied to the point 174 then initiates a switching cycle which causes the lower diode to come to rest at the point 370 and the upper diode 100 to come to rest at the point 371. Subsequently, upon application of an analog signal to the input circuit of the summing amplifier 115, the operating point of the lower diode 110 shifts from the point 370 to the initial operating point 361 and the operating point of the upper diode 100 shifts from the point 371 to the initial operating point 360.

If, however, at the completion of a conversion cycle, the operating points of the diodes 100 and 110 of FIG. 1 are at the points 492 and 491, respectively, as shown in FIG. 4, a current flow in the amplifier output lead 118 in the direction of the dashed arrow 121 simply causes these operating points to be maintained, since the current difference therebetween is already $-\Delta I$. The positive reset switching signal from the shift register circuit 105 then initiates a switching cycle which causes the operating point of the lower diode 110 to come to rest again at the point 491 and the operating point of the upper diode 100 to come to rest again at the point 492. Subsequently, upon application of an analog signal to the input circuit of the summing amplifier 115, which causes the current in the amplifier output lead 118 to assume the direction indicated by the arrow 122, the operating point of the lower diode 110 shifts from the point 491 to the initial operating point 481 and the operating point of the upper diode 100 shifts from the point 492 to the initial operating point 480.

Referring back again to FIG. 1, there is shown connected to a point 175 between the resistor 173 and the diode 100 of the first stage of the converter an asymmetrically-conducting diode element 176 in series with a negative direct-current bias source 177. The element 176 in combination with the source 177 serves to limit the voltage which may appear across the series-aiding diodes 100 and 110, thereby insuring that the diodes respond in a highly reliable manner to applied pulses to provide the desired switching actions described herein.

More specifically, when the negative voltage between the point 175 and ground of FIG. 1 exceeds the voltage of the source 177, the diode 176 conducts and provides in shunt with the diodes 100 and 110 a low impedance path to ground, the value of the source 177 being selected such that trigger or transient pulses cannot possibly drive both of the diodes 100 and 110 at the same time to operating points on the relatively high voltage positive resistance regions of their characteristic curves. If both diodes were so driven, the highly reliable and systematic switching actions described herein would be inhibited and, as a result, an analog signal might be converted into a binary code group not representative thereof.

The three-stage shift register circuit 105 of FIG. 1 is depicted in detail in FIG. 5A. As seen in FIG. 5A, each shift register stage includes a voltage-controlled negative resistance diode connected in series with a resistor. Specifically, the first stage comprises a diode 501 connected in series with a resistor 502; the second stage comprises a diode 521 connected in series with a resistor 522; and the third stage comprises a diode 531 connected in series with a resistor 532. The plate electrodes of the diodes 501, 521, and 531 are connected to a positive source 540 of direct-current power. The upper end of each of the resistors 502 and 532 is connected to the output of the first clipping circuit 113 of FIG. 1, and the upper end of the resistor 522 is connected to the output of the second clipping circuit 114 of FIG. 1. Thus, for example, the source voltage for the series combination including the diode 501 and the resistor 502 is dependent both upon the value of the source 540 and the value of the output voltage level of the first clipping circuit 113. When the output voltage level of the circuit 113 is relatively high, viz., the level marked $V_H$ in FIG. 2, the diode 501 of FIG. 5A is biased for monostable operation at a relatively low voltage stable point 580 on its voltage-current characteristic curve 590 (see FIG. 5B), the characteristic curves for the diodes 521 and 531 being identical to the curve 590. On the other hand, when the output voltage level of the circuit 113 is relatively low, viz., the level marked $V_L$ in FIG. 2, the diode 501 is biased for bistable operation at a stable point 581 on the curve 590 of FIG. 5B.

Thus, if the diode 501 of FIG. 5A is initially biased at the point 580 by the source 540 and the output voltage level $V_H$ of the first clipping circuit 113 and a current trigger pulse of amplitude $\alpha$ applied to the point 503 from the synchronizer circuit 108 of FIG. 1, the operating point of the diode 501 simply shifts from the point 580 to a higher current point 582. Then, as the trigger pulse decreases to a zero value, the operating point shifts back to the initial point 580. If, however, the diode 501 is biased at the point 581 by the source 540 and the output voltage level $V_L$ of the first clipping circuit 113 and a current trigger pulse of amplitude $\alpha$ applied to the point 503, the operating point of the diode 501 switches from the point 581 to a point 583 on the relatively high voltage positive resistance region of the characteristic curve 590. Then, as the trigger pulse decreases to a zero value, the operating point shifts back to a stable point 584 whose corresponding voltage value $V_0$ is sufficient to turn on p-n-p transistor 504.

The emitter electrode of the transistor 504 is connected to a voltage-controlled negative resistance diode 507 which acts as a voltage source, and is also connected to a grounded resistor 508. The collector electrode of the transistor 504 is connected via resistors 505 and 510 to the cathode electrode of the upper diode 100 of the first converter stage. Thus, whenever the transistor 504 is turned on, a positive switching current flows through the series-aiding diodes 100 and 110 of FIG. 1, throwing both of these diodes into their low voltage states, thereby, as described in detail hereinabove, initiating a switching cycle in the first converter stage. This current flow continues until the output voltage level of the first clipping circuit 113 returns to the higher level $V_H$, at which time the operating point of the diode 501 is switched back to the stable point 580 whose corresponding voltage value $V_f$ is insufficient to maintain the transistor 504 on, whereby flow of the switching current to the first converter stage ceases.

During the time in which the transistor 504 is turned on, n-p-n transistor 506, whose base electrode is connected via resistor 509 to the collector electrode of the transistor 504, is also turned on, thereby causing a current $\alpha I$ to flow up through the diode 521 of the second shift register stage and through resistor 511 in the direction indicated by arrow 512. The emitter electrode of the transistor 506 is connected through a resistor 513 to the source 540 and is also connected to a clamping Zener diode 514.

The current flow $\alpha I$ through the diode 521 of the second shift register stage of FIG. 5A causes the diode 521 to be biased at the point 582 of the characteristic curve shown in FIG. 5B. When the output voltage level of the first clipping circuit 113 increases to the value $V_H$, thereby tending to turn off the transistors 504 and 506 of the first shift register stage, the current flow $\alpha I$ through the diode 521 of the second stage persists for a period which is dependent upon the turn-off time of the transistor 506. This persistent current, in combination with the output voltage level of the second clipping circuit 114, which level is applied to the second shift register stage and which assumes the value $V_L$ when the first clipping circuit output level assumes the value $V_H$, is sufficient to cause the diode 521 of the second shift register stage to switch over the peak point 585 to the relatively high voltage positive resistance region of the characteristic curve 590, whereby transistor 524 of the second shift register stage is turned on, thereby supplying a switching current signal to the series-aiding diodes 120 and 130 of the second converter stage and causing transistor 526 to be also turned on. In turn, the conduction of transistor 526 causes a current of value $\alpha I$ to flow upward through the diode 531 of the third shift register stage and through resistor 527 in the direction of arrow 528, thereby priming the third shift register stage for supplying a switching signal to the third converter stage upon the subsequent application to the third shift register stage of a voltage $V_L$ from the first clipping circuit 113.

Thus, in the manner described above, the free-running shift register circuit 105 selectively responds to trigger pulses from the synchronizer circuit 108 and to timing signals from the first and second clipping circuits 113 and 114 to supply sequential switching signals to the stages of the illustrative analog-to-digital converter shown in FIG. 1.

The synchronizer circuit 108 of FIG. 1 is depicted in detail in FIG. 6. The circuit 108 receives trigger pulses from the source 106 and adjusts their timing with respect to applied phase B timing signals from the source 112 so that the trigger pulses applied to the first shift register stage occur during the time in which the output voltage level of the second clipping circuit 114 undergoes a transition from $V_L$ to $V_H$, thereby insuring reliable operation of the first shift register stage. Alterntaively, a proper time relationship between trigger pulses and timing signals can be insured by controlling the trigger pulse source 106 by the master timing source 107.

The synchronizer circuit 108 shown in FIG. 6 operates in the following manner. At time 1 (see FIG. 2) a negative trigger pulse from the source 106 is applied through a conducting gate transistor 624 and a resistor 601 to a first voltage-controlled negative resistance diode 602, thereby switching the diode 602, which is biased for bistable operation by a positive source 605 of direct-current power, from its relatively low to its relatively high stable operating condition, whereby a current of value $\beta I$ is caused to flow in the direction of arrow 615 through a series combination including a second voltage-controlled negative resistance diode 612, an asymmetrically-conducting diode 613, and a current limiting resistor 614. The current $\beta I$ primes the diode 612 so that when a time 2 (see FIG. 2) the output voltage level of the phase B timing signal source 112 makes its maximum negative excursion to a value M, and only then, the diode 612 is switched from its relatively low to its relatively high stable operating condition, thereby turning on transistor 617, whose emitter electrode is connected through a biasing voltage source 618 to the source 605 and whose collector electrode is connected through a resistor 619 to the base of a transistor 628 which controls the state of conduction of the transistor 624. Also, the collector electrode of the transistor 617 is connected through a resistor 630 to ground and through a resistor 620 to the base electrode of an n-p-n transistor 621. The emitter electrode of the transistor 621 is connected to a biasing voltage source 622, and, furthermore, is connected through a resistor 623 to the first stage of the shift register circuit 105.

Thus, at time 2 (FIG. 2) the transistor 617 of the synchronizer circuit shown in FIG. 6 is turned on, thereby also turning on the transistor 621 which supplies a synchronized pulse to the first shift register stage. When the transistor 617 is turned on, a current flows through resistor 619 to cut off transistor 624 and thus reset the first diode 602 to its relatively low voltage stable condition, and when the phase B timing signal returns at time 3 to a relatively high voltage level $V_K$ (FIG. 2), the second diode 612 is also reset.

It is noted that my copending application Serial No. 51,016, filed August 22, 1960 is directed to subject matter which is related to the analog-to-digital converter disclosed herein.

It is emphasized that although particular attention herein has been directed to the use of tunnel diodes as the series-aiding elements of each converter stage, other two-terminal voltage-controlled negative resistance arrangements having characteristics of the type shown in FIGS. 3 and 4 may also be used therefor.

Furthermore, it is to be understood that the above-described arrangements are only illustrative of the application of the principles of the present invention. Numerous other arrangements may be devised by those skilled in the art without departing from the spirit and scope of this invention.

What is claimed is:

1. In combination in a system for converting an analog signal into an *n*-digit binary representation thereof, *n* stages arranged in a linear array, a first set of *n* negative resistance voltage-controlled diodes respectively included in said *n* stages, a second set of *n* negative resistance voltage-controlled diodes respectively included in said *n* stages, the pair of diodes associated with each stage being connected in series-aiding, first source means connected to said diodes for biasing one of each pair to the relatively high voltage positive resistance region of its voltage-current characteristic curve to a point at which a predetermined value of current flows therethrough and for biasing the other one of each pair to the relatively low voltage positive resistance region of its voltage-current characteristic curve to a point at which the same predetermined value of current flows therethrough, second source means connected to the midpoint of each pair of diodes for causing the current flow through each of the diodes of said first set to be different from the current flow through each of the diodes of said second set, and shift register circuit means for switching in sequence the diode pairs of said *n* stages.

2. A combination as in claim 1 wherein said second source means includes summing amplifier means.

3. A combination as in claim 2 further including binary-weighted current generating means connected between the midpoint of each pair of diodes and the input to said summing amplifier means.

4. In combination in a system for converting an analog signal into an *n*-digit binary representation thereof, *n* stages each including two negative resistance diodes of the voltage-controlled type connected in series-aiding, means for biasing one of the diodes of each of said stages to the relatively high voltage positive resistance region of its voltage-current characteristic curve and for biasing the other one of the diodes of each of said stages to the relatively low voltage positive resistance region of its voltage-current characteristic curve, summing amplifier means connected to the midpoint of the diodes of each of said stages for selectively passing through one of the diodes of each stage a greater current than through the other, and free-running shift register means for supplying across the series-aiding diodes of each of said stages in sequence a switching signal.

5. A combination as in claim 4 further including two-phase source means and trigger pulse source means for together controlling the operation of said free-running shift register means.

6. A combination as in claim 5 wherein said trigger pulse source means includes means for synchronizing the output pulses of said trigger pulse source means with respect to the output signals of said two-phase source means.

7. In combination in an analog-to-digital converter, two tunnel diodes connected in series-aiding, control current means and binary-weighted current generating means each connected to the midpoint of said diodes, means for biasing one of said diodes to a stable operating point on the relatively high voltage positive resistance region of its voltage-current characteristic curve and for biasing the other one of said diodes to a stable operating point on the relatively low voltage positive resistance region of its voltage-current characteristic curve, free-running shift register means for causing said one diode to switch to the relatively low voltage positive resistance region of its characteristic curve thereby to initiate a switching cycle, the direction of current flow at the output of said control current means respectively determining whether said current generating means is maintained on or turned off at the completion of said switching cycle.

8. In combination, two negative resistance voltage-controlled diodes connected in series-aiding, bipolar source means connected in parallel with one of said diodes, and shift register means connected in parallel with both of said diodes.

9. A combination as in claim 8 wherein said bipolar source means includes summing amplifier means having an input circuit and an output circuit.

10. A combination as in claim 9 further including analog signal source means connected to the input circuit of said summing amplifier means, and binary weighted current generating means connected between the midpoint of said series-aiding diodes and the input circuit of said summing amplifier means, the sum of the currents contributed to said input circuit by said current generating means and said analog signal source means being determinative of the direction of current flow in the output circuit of said summing amplifier means.

11. A combination as in claim 8 wherein said series-aiding diodes are characterized by two stable operating conditions, said combination further including means for biasing said diodes to one of said stable operating conditions, in which condition one of said series-aiding diodes is biased to a point on the relatively high voltage positive resistance region of its voltage-current characteristic curve and the other one of said diodes is biased to a point on the relatively low voltage positive resistance region of its voltage-current characteristic curve.

12. In combination in an analog-to-digital converter stage, two negative resistance diodes of the voltage-controlled type connected in series-aiding, summing amplifier means directly connected to the midpoint of said diodes, and shift register means connected in parallel with said series-aiding diodes.

13. In combination in a system for converting an analog signal to an $n$-digit binary representation thereof, $n$ binary-weighted stages arranged in a linear array, each of said stages having first and second stable operating conditions and including two tunnel diodes connected in series-aiding, means for setting said stages to their first operating conditions, two-phase clock pulse source means, trigger pulse source means, and shift register means responsive to pulses from said clock source means and said trigger source means for sequentially switching said stages to their second operating conditions.

14. A combination as in claim 13 further including means coupled to the midpoint of the series-aiding diodes of each of said stages for successively comparing the amplitude of the analog signal to be converted with the cumulative amplitude of signals derived from the successive switchings of said stages and for switching the most recently switched stage back to its first operating condition whenever the cumulative amplitude exceeds the amplitude of the analog signal.

15. In combination in a system for converting an analog signal into an $n$-digit binary representation thereof, $n$ stages each including two negative resistance diodes of the voltage-controlled type connected in series-aiding, means for biasing one of the diodes of each of said stages to the relatively high voltage positive resistance region of its voltage-current characteristic curve and for biasing the other one of the diodes of each of said stages to the relatively low voltage positive resistance region of its voltage-current characteristic curve, and means for supplying across the series-aiding diodes of each of said stages in sequence a switching signal.

16. A combination as in claim 15 wherein said supplying means includes a shift register circuit.

No references cited.